United States Patent Office 3,337,574
Patented Aug. 22, 1967

3,337,574
REACTIONS OF 2-MERCAPTOBENZOTHIAZOLES AND OXALYL CHLORIDE
John J. D'Amico, Dunbar, W. Va., assignor to Monsanto Company, St. Louis, Mo., a corporation of Delaware
No Drawing. Original application Oct. 16, 1964, Ser. No. 404,500, now Patent No. 3,256,294, dated June 14, 1966. Divided and this application Aug. 19, 1965, Ser. No. 505,441
4 Claims. (Cl. 260—306)

This application is a division of application Ser. No. 404,500, filed Oct. 16, 1964, now U.S. Patent 3,256,294.

This invention relates to new compounds from reactions of heterocyclic mercaptans and oxalyl chloride and to methods for their production. The new compounds include S,S'-bis(2-heterocyclic)-1,2-dithiooxalates of the formula

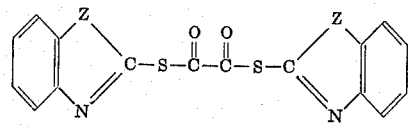

where Z is O or NH. More particularly, the invention relates to S,S'-bis(2-benzimidazolyl) - 1,2 - dithiooxalate, S,S'-bis(2-benzoxazolyl)-1,2-dithiooxalate, carbonyl bis-3-(2-benzothiazolinethione) and 2,2'-(benzoxazolyl) dithiocarbonate. It also relates to a new method for preparing 2,2'-thiobis(benzothiazoles).

An object of the invention is to provide new and useful compounds by reacting heterocyclic mercaptans with oxalyl chloride.

A further object of the invention is to provide an improved composition with herbicidal properties against various grasses and broadleaf plants.

A further object of the invention is to provide an improved composition having antidegradant properties in natural rubber.

A further object of the invention is to provide improved compositions which accelerate the vulcanization of rubber.

A further object of the invention is to provide improved compositions which are useful as fungicides.

A further object of the invention is to provide a new method for the synthesis of 2,2'-thiobis(benzothiazoles).

The S,S'-bis(2 - benzimidazolyl)-1,2-dithiooxalate was prepared in the following manner. To a stirred slurry containing 90.2 grams (0.6 mole) of 2-mercaptobenzimidazole and 600 ml. of anhydrous benzene, 42 grams (0.33 mole) of oxalyl chloride was added dropwise at 50° to 60° C. over a 15-minute period. The stirred reaction mixture was heated at reflux for 5 hours. After cooling to 5° C., the solid product was collected by filtration and air dried at 25° to 30° C. The product, S,S'-bis(2-benzimidazolyl)-1,2-dithiooxalate, melting point 195°–197° C. with decomposition, was obtained in 99% yield. The elemental analysis, molecular weight, ultraviolet and infrared spectra were in agreement for the compound S,S'-bis(2-benzimidazolyl) - 1,2 - dithiooxalate. Nitrogen and sulfur analysis of the product showed 15.86% nitrogen and 18.41% sulfur. Calculated percentages for $$C_{16}H_{10}N_4O_2S_2$$

are 16.27% nitrogen and 18.62% sulfur.

The product, S,S'-bis(2-benzimidazolyl) - 1,2 - dithiooxalate, reacted rapidly with ethyl alcohol. For example, a stirred slurry containing 68.9 grams (0.2 mole) of the product described in the preparation, supra, and 100 ml. of ethyl alcohol was heated at reflux for 4 hours. After cooling to 0° C., the solid was collected by filtration and air dried at 25° to 30° C. The 2-mercaptobenzimidazole, melting point 302°–303° C., was obtained in 97% yield. After recrystallization from ethyl alcohol the melting point remained unchanged. A mixture melting point with an authentic sample was not depressed and the infrared spectra of the two were superimposable. The filtrate was distilled at 760 mm. pressure to remove excess alcohol. The distillation of the residue in vacuo furnished diethyl oxalate, boiling point 96°–97° C./20 mm., in 75.2% yield. The infrared spectra of the diethyl oxalate derived from this method and an authentic sample were superimposable. These data further support the structure assigned to the product.

S,S'-bis(2-benzimidazolyl)-1,2-dithiooxalate has contact herbicidal properties. The test for contact herbicidal properties consisted of several steps. First, a counted number of seeds of various grasses and broadleaf plants (listed in Table I, infra) were planted in standard soil in a flat aluminum pan. The pan used had been perforated on the bottom for proper drainage. The pans of planted seeds were placed in a moist greenhouse bench and allowed to take up water from below as needed. Two weeks after the resulting seedlings emerged they were sprayed with 6 cubic centimeters of a 0.5% concentration spray of S,S'-bis(2 - benzimidazolyl) - 1,2 - dithiooxalate. The amount of spray applied to the test area was equivalent to approximately 9 pounds per acre. After 14 days, the plants were observed and all injuries were noted. The degrees of injury are given in Table I under herbicidal rating.

*Table I*

| Test plant: | Herbicidal rating |
|---|---|
| Wild oat | 2 |
| Brome grass | 2 |
| Crab grass | 4 |
| Pigweed | 4 |
| Soybean | 2 |
| Sorghum | 2 |

In Table I, 2 indicates moderate injury and 4 indicates that the plants were dead at the time of observation.

S,S'-bis(2-benzimidazolyl) - 1,2 - dithiooxalate also displayed antidegradant properties in natural rubber. It doubled the tensile strength of natural rubber as compared to an untreated control after aging 7 hours at 121° C. under 80 pounds air pressure per square inch. The protected rubber contained 1.5% by weight of the aforesaid antidegradant.

The S,S'-bis(2-benzoxazolyl-1,2-dithiooxalate and 2,2'-(benzoxazolyl)dithiocarbonate were prepared in the following manner. To a stirred slurry containing 60.4 grams (0.4 mole) of 2-mercaptobenzoxazole and 600 ml. of anhydrous benzene, 28 grams (0.22 mole) of oxalyl chloride was added dropwise at 50° to 60° C. over a 15-minute period. The stirred reaction mixture was heated at reflux for 24 hours. After cooling the stirred reaction mixture to 30° C., the precipitate was collected by filtration and air dried at 25°–30° C. The product, M.P. 175°–176° C. with decomposition, was obtained in 41.2% yield. After recrystallization from ethyl acetate-acetone, it melted at 176°–178° C. with decomposition. The elemental analysis, molecular weight, ultraviolet and infrared spectra were in agreement for the compound 2,2'-(benzoxazolyl)dithiocarbonate. This product was found to be a useful fungicide for the control of rhizoctonia and pythium.

Another product was isolated from the filtrate. The benzene and oxalyl chloride were removed from the filtered solution in vacuo at a maximum temperature of 30° C. at 1 to 2 mm. pressure. The resulting solid was air dried at 25° to 30° C. The product, melting point 131°–133° C. with decomposition, was obtained in 57.7% yield. After recrystallization from ethyl acetate, the product melted at 154°–155° C. with decomposition. The elemental analysis, molecular weight, ultraviolet and infrared spectra were in agreement for the compound S,S'-bis(2-benzoxazolyl)-1,2-dithiooxalate. Nitrogen and sulfur analysis of this product showed 7.92% nitrogen and 18.01% sulfur. Calculated percentages for $C_{16}H_8N_2O_4S_2$ are 7.86% nitrogen and 18.00% sulfur. S,S'-bis(2-benzoxazolyl)-1,2-dithiooxalate was found to mildly accelerate the vulcanization of rubber. It was also found to be a fungicide useful for the control of rhizoctonia and pythium.

An attempt was made to prepare the corresponding dicarbonyl compound from mercaptobenzothiazole and oxalyl chloride, but the reaction took an entirely different course. The reaction was carried out in a one-liter 3-necked flask equipped with an aqueous sodium hydroxide trap in order to remove hydrogen chloride and gas sample bottles to collect carbon monoxide and carbonyl sulfide. To a stirred slurry containing 66.9 grams (0.4 mole) of recrystallized 2-mercaptobenzothiazole in 600 ml. of anhydrous benzene, 27.9 grams (0.22 mole) of oxalyl chloride was added dropwise at 50° to 60° C. over a period of 15 minutes. During the addition of oxalyl chloride the color of the reaction mixture changed from yellow to brown and finally to a purple color. The stirred reaction mixture was heated at reflux for 24 hours. Gas samples were taken at one-hour and 5-hour intervals. The infrared spectra of these samples were superimposable with authentic samples of carbon monoxide and carbonyl sulfide. The stirred reaction mixture was cooled to 30° C. The solids were removed by filtration and air dried at 25° to 30° C. This product, carbonyl bis-3-(2-benzothiazolinethione), was obtained in 19.4% yield. The carbonyl bis-3-(2-benzothiazolinethione) was a yellow crystal with a melting point of 179°–180° C. with decomposition. The melting point remained unchanged after recrystallization from dimethylformamide. Analysis gave 7.70% nitrogen and 35.49% sulfur compared to 7.77% nitrogen and 35.58% sulfur calculated for $C_{15}H_8N_2OS_4$. A molecular weight of 357 was found. The calculated molecular weight for $$C_{15}H_8N_2OS_4$$

was 360. The infrared spectrum of carbonyl bis-3-(2-benzothiazolinethione) was obtained from solutions of chloroform and dimethylformamide. The spectrum was consistent with the proposed structure as indicated in Table II, infra.

of 29,000 at 328 millimicrons which has been attributed to the

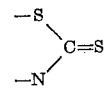

group while S-substituted derivatives absorbed in the region of 275 millimicrons with molar absorptivities of approximately 21,000. Therefore, the ultraviolet spectrum was characteristic of carbonyl bis-3-(2-benzothiazolinethione).

In U.S. Patent 1,928,773, Williams reported the formation of 2,2'-(benzothiazolyl)dithiocarbonate from a reaction of sodium-2-mercaptobenzothiazole and carbonyl chloride, as a pale yellow solid, soluble in benzene which melted at 134° C. Investigation of this reaction confirmed that the product melted at about 134° C., but analysis thereof revealed that it was a mixture of 2-mercaptobenzothiazole and 2,2'-thiobis(benzothiazole) instead of 2,2'(benzothiazolyl)dithiocarbonate. My product, carbonyl bis-3-(2-benzothiazolinethione), was not present in the resulting mixture produced when sodium-2-mercaptobenzothiazole and carbonyl chloride were reacted. However, as I described, supra, when oxalyl chloride was reacted with 2-mercaptobenzothiazole in an anhydrous medium the new compound, carbonyl bis-3-(2-benzothiazolinethione), was present in the product.

As shown by the data, infra, carbonyl bis-3-(2-benzothiazolinethione) was found to be an active accelerator for the vulcanization of natural rubber. To illustrate the accelerating properties of carbonyl bis-3-(2-benzothiazolinethione), a vulcanizable stock was compounded comprising

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Sulfur | 2.0 |
| Antidegradant | 2.0 |
| Carbonyl bis-3-(2-benzothiazolinethione) | 0.5 |

Vulcanization was completed at a temperature of 144° C., and all tests were on 65-minute cures (except the Mooney scorch). The following results were obtained on the stock:

*Table II*

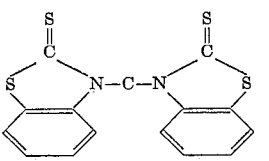

| | $\gamma$(cm.$^{-1}$) | Assignment |
|---|---|---|
| Carbonyl bis-3-(2-benzothiazolinethione) | 3030 weak | C—H stretching (aromatic). |
| | 1735 medium | C=O stretching. |
| | 1465 medium | C=C skeletal in-plane vibration. |
| | 1332 strong | C=S stretching. |
| | 1300 medium | C—N stretching. |
| | 761 strong | C—H out-of-plane deformation of 1,2-substituted phenyl group. |
| | 728 medium | |

Further data for proof of the structure of carbonyl bis-3-(2-benzothiazolinethione) was obtained from ultraviolet analysis. In the ultraviolet spectrum, an absorption maximum was noted at 304 millimicrons having a high molar absorptivity of 29,600 liter/mole-cm. The ultraviolet spectrum of mercaptobenzothiazole and its N-substituted derivatives have molar absorptivities in the order

| | |
|---|---|
| Mooney scorch at 135° C. (minutes) | 10.3 |
| Modulus of elasticity at 300% elongation (lbs./in.²) | 1450 |
| Tensile at break in lbs./in.² | 2400 |
| Ultimate elongation (percent) | 410 |

Another product was isolated from the filtrate of the 2-mercaptobenzothiazole and oxalyl chloride reaction described, supra. The benzene and excess oxalyl chloride were removed in vacuo at a maximum temperature of 30° to 40° C. at 1 to 2 mm. pressure. The resulting solids were added to 600 ml. of water containing 64 grams (0.4 mole) of 25% aqueous sodium hydroxide and stirred at 25° to 30° C. for 1 hour. The solids were collected by filtration, washed with water until neutral to litmus and air dried at 25° to 30° C. The product, 2,2′ - thiobis (benzothiazole), melting point 95°–97° C. was obtained in 80.6% yield. After recrystallization from ethyl alcohol, it melted at 101°–102° C. Vapor phase chromatographic analysis of samples of the product and recrystallized product gave only one peak. Analysis gave 9.23% nitrogen and 32.03% sulfur compared to 9.33% nitrogen and 32.03% sulfur calculated for $C_{15}H_8N_2S_3$. Thus, the dicarbonyl product from 2-mercaptobenzothiazole reacted with oxalyl chloride was not obtained. Instead, a new method for preparing 2,2′-thiobis(benzothiazole) was revealed. Further investigation showed that this was a general method for the preparation of 2,2′-thiobis(benzothiazoles). For example, the benzene ring of the starting material can be substituted with substituents such as halogen, $NO_2$, aryl, lower alkyl or lower alkoxy where the alkyl is methyl, ethyl, propyl, isopropyl or amyl. Suitable starting materials comprise 5 - chloro - 2 - mercaptobenzothiazole, 6 - nitro - 2 - mercaptobenzothiazole, 6-methoxy - 2 - mercaptobenzothiazole, 4 - methoxy-2-mercaptobenzothiazole, 6 - ethoxy - 2 - mercaptobenzothiazole, 4 - methyl - 2 - mercaptobenzothiazole and 4- or 6-phenyl-2-mercaptobenzothiazole.

2,2′ - thiobis(5-chlorobenzothiazole) was prepared in the follow manner. To a stirred slurry containing 40.3 grams (0.2 mole) 5-chloro - 2 - mercaptobenzothiazole in 500 ml. of anhydrous benzene, 14 grams (0.11 mole) of oxalyl chloride was added dropwise at 50° to 60° C. over a 15-minute period. The stirred reaction mixture was heated at reflux for 18 hours. After cooling to 25° C., the solids were collected by filtration. The wet solids were added to 600 ml. of water containing 32 grams (0.2 mole) of 25% aqueous sodium hydroxide and stirred for 1 hour. The solids were collected by filtration, washed with water until the washings were neutral to litmus and air dried at 25°–30° C. The product, melting point 171°–172° C., was obtained in 99% yield. After recrystallization from dimethylformamide, it melted at 172°–173° C. The vapor phase chromatographic analysis of the product and a recrystallized sample of the product gave only one peak. Analysis gave 7.40% nitrogen, 26.13% sulfur and 19.38% chlorine as compared to 7.57% nitrogen, 26.05% sulfur and 19.20% chlorine calculated for $C_{14}H_6Cl_2N_2S_3$.

The formation of S,S′-bis(2-benzimidazolyl) - 1,2-dithiooaxalate is significant not only because of the ease with which it undergoes alcoholysis but because of the kaleidoscopic nature of oxalyl chloride. With various reagents, oxalyl chloride reacts like a dehydrating agent, a chlorinating agent or a mixture of phosgene and carbon monoxide as well as like an acid chloride.

It is intended to cover all changes and modifications of the examples of the invention herein chosen for purposes of disclosure which do not constitute departures from the spirit and scope of the invention.

I claim:
1. Carbonyl bis-3-(2-benzothiazolinethione).
2. The method of synthesizing carbonyl bis-3-(2-benzothiazolinethione) which comprises reacting oxalyl chloride with 2-mercaptobenzothiazole and isolating carbonyl bis-3-(2-benzothiazolinethione).
3. The method of synthesizing 2,2′-thiobis(benzothiazoles) which comprises reacting oxalyl chloride with a 2-mercaptobenzothiazole of the formula

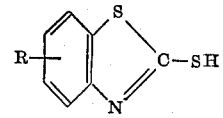

where R is selected from the group consisting of aryl, lower alkyl, lower alkoxy, Cl or $NO_2$ and isolating the corresponding 2,2′-thiobis(benzothiazole).
4. The method of synthesizing 2,2′-thiobis(benzothiazole) which comprises reacting oxalyl chloride with 2-mercaptobenzothiazole and isolating 2,2′-thiobis(benzothiazole).

References Cited

Zinner et al., J. Prakt. Chem., vol. 14, pp. 139–149 (1961).

ALEX MAZEL, *Primary Examiner.*

ALTON D. ROLLINS, *Assistant Examiner.*